(12) United States Patent
Yang (10) Patent No.: US 8,083,385 B1
(45) Date of Patent: Dec. 27, 2011

(54) SUNLIGHT ATTENUATION VISOR (76) Inventor: Yongwu Yang, Belmont, MA (US)

( * ) Notice: Subject to any disclaimer, the term of this patent is extended or adjusted under 35 U.S.C. 154(b) by 1096 days.

(21) Appl. No.: 11/924,619

(22) Filed: Oct. 26, 2007

(51) Int. Cl.
- B60Q 1/00 (2006.01)
- F21V 1/00 (2006.01)
- F21V 17/02 (2006.01)
- G02F 1/1335 (2006.01)

(52) U.S. Cl. ......... 362/492; 362/509; 362/512; 349/13
(58) Field of Classification Search .......... 362/492, 362/509, 512; 349/13
See application file for complete search history.

(56) References Cited

U.S. PATENT DOCUMENTS

| | | |
|---|---|---|
| 2,112,726 A | 7/1936 | Kemp et al. |
| 3,731,986 A | 5/1973 | Fergason |
| 4,641,922 A * | 2/1987 | Jacob .............................. 349/16 |
| 5,434,690 A * | 7/1995 | Hisatake et al. .................. 349/8 |
| 5,460,749 A * | 10/1995 | Terada et al. ............ 252/299.61 |
| 7,300,167 B2 * | 11/2007 | Fernando et al. ............. 359/609 |

* cited by examiner

Primary Examiner — Mike Qi
(74) Attorney, Agent, or Firm — Michael D. Eisenberg (57) ABSTRACT An apparatus for attenuating the intensity of light transmitted through the apparatus is provided. In one embodiment, the apparatus may comprise a first polarizer having a first polarizing orientation and a second polarizer having a polarizing orientation perpendicular to the first polarizer. First and second electrodes are disposed between the polarizers and a nematic liquid crystal layer is disposed between the electrodes. At least one light detector positioned for measuring the intensity of the transmitted light may be positioned on an outer side of the second polarizer. A voltage controller in electrical communication with the light detector is provided for controlling the voltage level applied to the electrodes based on the intensity of the measured light wherein the voltage determines the amount of light transmitted through the apparatus.

11 Claims, 6 Drawing Sheets

SUNLIGHT ATTENUATION VISOR

TECHNICAL FIELD

The present invention relates to an adjustable light attenuation apparatus, and more particularly, some embodiments relate to an automatic light attenuation apparatus adapted for use in automobiles to protect drivers from strong sunlight glare.

BACKGROUND OF THE INVENTION

A problem that often arises for drivers of vehicles is the blinding effect of sunlight through the windshield and windows of their vehicles. The visors positioned near the top of the windshield have been utilized as one solution to the problem of blinding sunlight. Another method of reducing sunlight glare is the use of a tinted belt-filter layer along the top portion of the windshield. However, a tinted layer coated only on the top portion of the windshield is not effective for reducing the glare through the rest of the windshield. Also, the sunlight entering through the top portion of the windshield can be blocked entirely by the blind visor. Neither device reduces sunlight in the middle portion (i.e., driver's field of view) of the windshield, which sometimes can result in significant hazardous driving conditions.

Hazardous driving conditions can become even more severe during times of high traffic for those who drive east in the morning and west in the afternoon, when the sun shines directly into drivers' eyes from a low angle above the horizon. As neither visor nor tinted layer in current vehicles reduces the direct sunlight in the middle portion of the windshield, drivers can feel a strong sting from the sun's glare. A driver may be inclined to avoid looking forward at the sun even while wearing sunglasses. Current state of the art general use sunglasses are not designed for looking at the sun directly. In addition, it is inconvenient for drivers wearing prescription glasses to wear sunglasses. Drivers may try to look slightly sideways or sit up tall and look downward to alleviate the problem, although this is inadequate as the sun's glare is prevalent throughout the field of view. As the clarity of the front view is greatly reduced, drivers usually have to slow down dramatically, compounding the east bound traffic in the morning and west bound traffic in the evening. This results in wasted energy resources and driver's time, and can contribute to green gas generation and thus global warming.

U.S. Pat. No. 2,112,726 to Kempt et al. describes a device to install a glare screen either in between the windshield and visor or in combination with a visor to protect the driver from the sun's direct rays, or headlights, diffused or reflected rays. U.S. Pat. No. 4,130,317 to Lai describes an improved clamping device for the holding of a sun-reducing glass in an automobile. Both patents only teach installing a sun glare-reducing glass, and do not address the glare screen itself. The transparent or translucent glare-reducing glasses recommended by Kempt et al. do reduce sunlight to a certain degree. However, due to its transmission invariability, Kempt's glasses either insufficiently reduce or reduce too much sunlight depending on the materials the glasses are composed of.

Therefore, there is a need for a device with adjustable attenuation of sunlight for automobiles. When it is in use, it would be preferable for a device to block the proper amount of sunlight so that the glare suffered by drivers will be reduced and they will be able to see the road conditions clearly and comfortably. In addition, as the intensity of sunlight viewed by the driver varies depending on the time of day, weather conditions, the time of the year, and road direction change (for example, the sun may appear directly in front, to the left, or to right when the road curves), it is desirable that the attenuation of sunlight is automatically adjusted so that the driver sees relatively constant light and driving visibility is less affected.

BRIEF SUMMARY OF EMBODIMENTS OF THE INVENTION

According to one embodiment of the invention, an apparatus for adjusting the intensity of light transmitted through the apparatus is provided. The apparatus comprises a first polarizer having a polarizing orientation, and a second polarizer having a polarizing orientation perpendicular to the polarizing orientation of the first polarizer. Two electrodes, a first and second electrode, are disposed between the polarizers, and a nematic liquid crystal layer is disposed between the electrodes. At least one light detector is positioned for measuring the intensity of the transmitted light, and a voltage controller is in electrical communication with the light detector. The voltage controller controls the voltage level applied to the electrodes based on the intensity of the measured light, wherein the voltage determines the amount of light transmitted through the apparatus.

In another embodiment, the apparatus for attenuating sunlight has electrodes that are embedded on a translucent substrate.

In a further embodiment of the apparatus for attenuating sunlight, the substrate is glass.

In another embodiment of the apparatus for attenuating sunlight, the translucent substrate is capable of filtering ultraviolet and infrared light.

In still another embodiment, the apparatus for attenuating sunlight contains polarizers that are thin film polarizers.

In yet a further embodiment, the apparatus for attenuating sunlight has a light detector that is a photodiode.

In another embodiment of the apparatus for attenuating sunlight, the voltage controller is configured to apply a maximum voltage to the electrodes wherein the maximum voltage corresponds to the lowest predetermined transmittance of the apparatus.

In a further embodiment of the apparatus for attenuating sunlight, a power supply in electrical contact with the electrodes has a maximum power output that yields a transmittance of the apparatus selected from the range of between 0% to 50% when a voltage established by the power supply is applied to the electrodes.

In a further embodiment of the apparatus for attenuating sunlight the light detector is disposed on an outer side of the second polarizer.

In yet another embodiment, the apparatus for attenuating sunlight comprises a plurality of light detectors in electrical communication with the voltage controller wherein the voltage controller is configured to adjust the voltage to the electrodes based on an average of the output from the plurality of light detectors.

In still another embodiment of the apparatus for attenuating sunlight, a plurality of light detectors is in electrical communication with the voltage controller and is configured to send a signal to the voltage controller based on the intensity of the measured light. In one embodiment, the voltage controller is configured to vary the voltage to the electrodes and thus, the electric field applied to the nematic liquid crystals, until the light detectors send a signal to the voltage control that falls within a predetermined range, so that the glare from sunlight stays within a more acceptable level.

In another embodiment, the apparatus for attenuating sunlight has a visor for adjusting the intensity of light transmitted through the visor. The visor comprises a first polarizer having a polarizing orientation and a second polarizer having a polarizing orientation perpendicular to the polarizing orientation of the first polarizer. The visor also contains first and second electrodes disposed between the polarizers, and nematic liquid crystals disposed between the electrodes. The visor further has a voltage controller for controlling the voltage level applied to the electrodes, wherein the voltage determines the degree of distortion of the nematic liquid crystals, and thus the amount of light transmitted through the apparatus.

In yet another embodiment of the sunlight attenuation apparatus, the visor further comprises an opaque member and a light filtering portion comprising a frame having a pivoting edge and connected to and for supporting the first and second polarizers and the nematic liquid crystals. The visor also has a shaft connected on a pivoting edge of the frame, and two connecting portions on the pivoting edge of the frame for connecting the shaft to the opaque member. The light filtering portion can be folded onto the opaque member so that the visor can function as a traditional visor or be unfolded to automatically adjust the amount of light filtered through the apparatus.

In still another embodiment of the sunlight attenuation apparatus, the visor further comprises a jaw and spring clip assembly for connecting the visor to a traditional visor on a lower edge of the traditional visor. The visor may also include friction generating means for permitting selective positioning of the visor when the visor is rotated out of a folded position, and a spring clip for removably securing the visor to an upper edge of the traditional visor. When the visor is in a folded position, the spring clip will removably hold the visor to the traditional visor in the folded position.

In another embodiment of the apparatus for attenuating sunlight, the friction generating means for the visor is a spring-loaded socket.

In still another embodiment, the apparatus for attenuating sunlight contains a visor that has a frame with an opaque portion. The frame is connected to and for supporting the first and second polarizers and the nematic liquid crystals. The frame contains grooves on sides of the frame that are slidable on a motorized rail connectable to a vehicle.

In yet another embodiment, the apparatus for attenuating sunlight has a visor further comprising at least one light detector positioned on an outer side of the second polarizer for measuring the intensity of the transmitted light. The voltage controller is in electrical communication with the light detector, and controls the voltage level applied to the electrodes based on the intensity of the measured light, and the voltage determines the amount of light transmitted through the apparatus.

In another embodiment, a method of attenuating sunlight in an automobile comprises filtering incident sunlight through a first polarizer having a first polarizing orientation, changing the polarization of the sunlight filtered from first polarizer by passing it through nematic liquid crystals, and filtering the sunlight filtered from the nematic liquid crystals through a second polarizer having a second polarizing orientation. The method of attenuating sunlight may further include measuring the intensity of filtered light from second polarizer, and applying an electric field to the nematic liquid crystals. The electric field has a strength based on the intensity of the filtered light from the second polarizer.

In a further embodiment, the method of attenuating sunlight comprises varying the electric field to the nematic liquid crystals until the signal from the light detector is within a predetermined range.

In one embodiment, an automatic adjustable light attenuation apparatus is provided. The apparatus utilizes the birefringence properties of materials, such as certain liquid crystalline molecules, in the presence or absence of an electric field.

In a preferred embodiment of the present invention, a liquid crystal layer is placed between two glass plates with transparent electrodes, for example, indium tin oxide (ITO, or tin-doped indium oxide). The two glass plates are disposed between two film polarizers that are oriented so that their polarizations are perpendicular to each other. The liquid crystal is chosen in its twisted nematic phase (a common liquid crystal application is taught in U.S. Pat. No. 3,731,986 to Fergason). This twisted phase reorients the polarization of the light that has passed through the first polarizer (50% transmittance through the first polarizer while the other 50% of light is absorbed by this first polarizer), allowing it to be transmitted through the second polarizer. Therefore the total transmittance through this device when voltage is not applied to the device is 50%.

When a voltage is applied across the electrodes, a torque acts to align the liquid crystal molecules parallel to the electric field. This reduces the rotation of the polarization of the incident light after the first polarizer, thus less light transmits through the second polarizer. If the applied voltage is large enough, the liquid crystal molecules are completely untwisted and the polarization of the incident light is not rotated as it passes through the liquid crystal layer. The light passed through the first polarizer is then completely absorbed by the second polarizer and thus no light goes through this device, i.e., 0% transmittance. By controlling the voltage applied across the liquid crystal layer, light passing through this device can be changed from 50% to 0%.

For some applications of the apparatus for attenuating light, the lowest transmission of this device is designed above 0% according to a current standard or future standards. (The current standard of sunglasses for drivers is above 8%). This is achieved by designing a power supply so that its maximum voltage output results in the set lowest transmittance of the device. Through adjusting the voltage from 0 to its maximum, the device provides a variable transmission from 50% to the set lowest transmittance. Because the response of the liquid crystal to voltage change is instantaneous, the transmission change is also instantaneous.

Another important aspect of the preferred embodiment of the present invention is that one to four photodiodes may be installed on the corner(s) of the device behind the second polarizer to measure light transmitted through the device (the amount of light that reaches to the driver) and the output of the photodiode (or average if more than one photodiode are used) provides a feedback signal to the voltage controller. The controller may automatically change the voltage applied to the liquid crystal layer so that the light intensity is adjusted according to a predefined light level. Thus the amount of light the driver sees remains constant independent of sunlight variation due to weather condition, time of the day, time of the year, and road curvature. The light level may be either preset during manufacturing or reset by the driver according to the driver's own comfortable level.

A further important aspect of the preferred embodiment of the present invention is to use proper filter glass to filter out the unwanted or harmful radiation from the Sun to protect a driver from long time exposure to such radiation. Solar radiation reaching the surface of the earth expands from ultraviolet (UV) radiation (wavelengths>290 nm) to radio waves (wavelength in the meter range). UV radiation (from 290 nm to 380 nm) is harmful to living organisms and near infrared light (from 700 nm to 1400 nm) cannot be seen and may contribute unwanted heating. Only visible radiation from 380 nm to 700 nm provides illumination for viewing. Therefore, using filter glass which only passes visible light from 380 nm to 700 nm for sandwiching liquid crystal layer for the device will further save the driver from exposure to such harmful and useless radiation.

In a further embodiment, the adjustable sunlight attenuation apparatus may be implemented with a traditional visor in a vehicle. The methods and apparatus may comprise: (a) using a holder to secure the above mentioned apparatus; (b) installing the shaft of the holder to the spring loaded socket or other friction creation means at the free edge of the traditional visor to form a permanent unit for new vehicles; or (c) using jaws and spring clips to clamp spring loaded socket or other friction creation means to the free edge of the traditional visor which is already installed in the vehicle, then installing the holder to the socket or other friction creation means as mentioned in (b). The sunlight attenuation apparatus may be unfolded from the traditional visor and swung to any preferred angle in front of or on the side of the driver to automatically adjust to sunlight changes so that the light to the driver remains constant. If not needed, it may be folded onto the traditional visor, and the unit as a whole will function as a traditional visor.

The present invention further provides a method for installing the sunlight attenuation device as a power unit independent of a traditional visor to be powered down to the front of the driver interposed between the driver and the windshield, or powered up to its stowed position. In one example, the stowed position is near a forward portion of the roof near the driver. The method comprises (1) using a frame having grooves on sides of the frame to secure the apparatus and (b) installing the holder through the grooves to motorized rails.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time to time, the present invention is described herein in terms of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments. Unless defined otherwise, all technical and scientific terms used herein have the same meaning as is commonly understood by one of ordinary skill in the art to which this invention belongs.

The present invention is directed toward an automatically adjusting sunlight attenuation apparatus for vehicles, such as automobiles. When in use, a driver's visibility is greatly improved under conditions of strong sunlight and in particular, during times of sunrise and sunset for drivers traveling east and west, respectively.

Figure 1A:
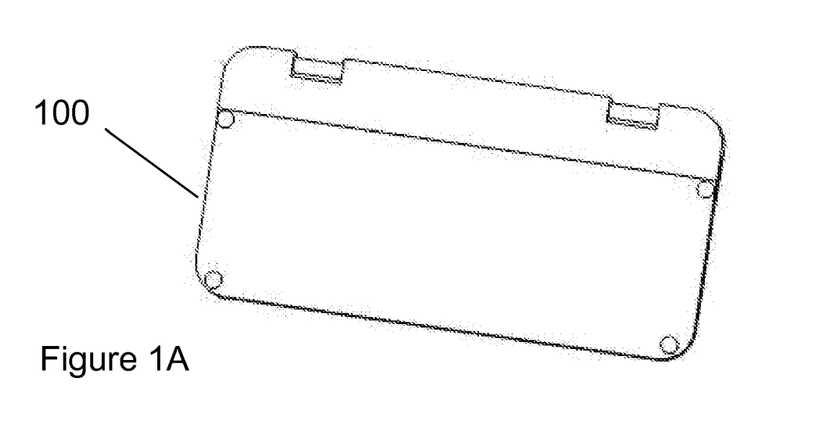
FIG. 1A is a perspective view of a preferred embodiment of the sunlight attenuation apparatus.
Figure 1B:
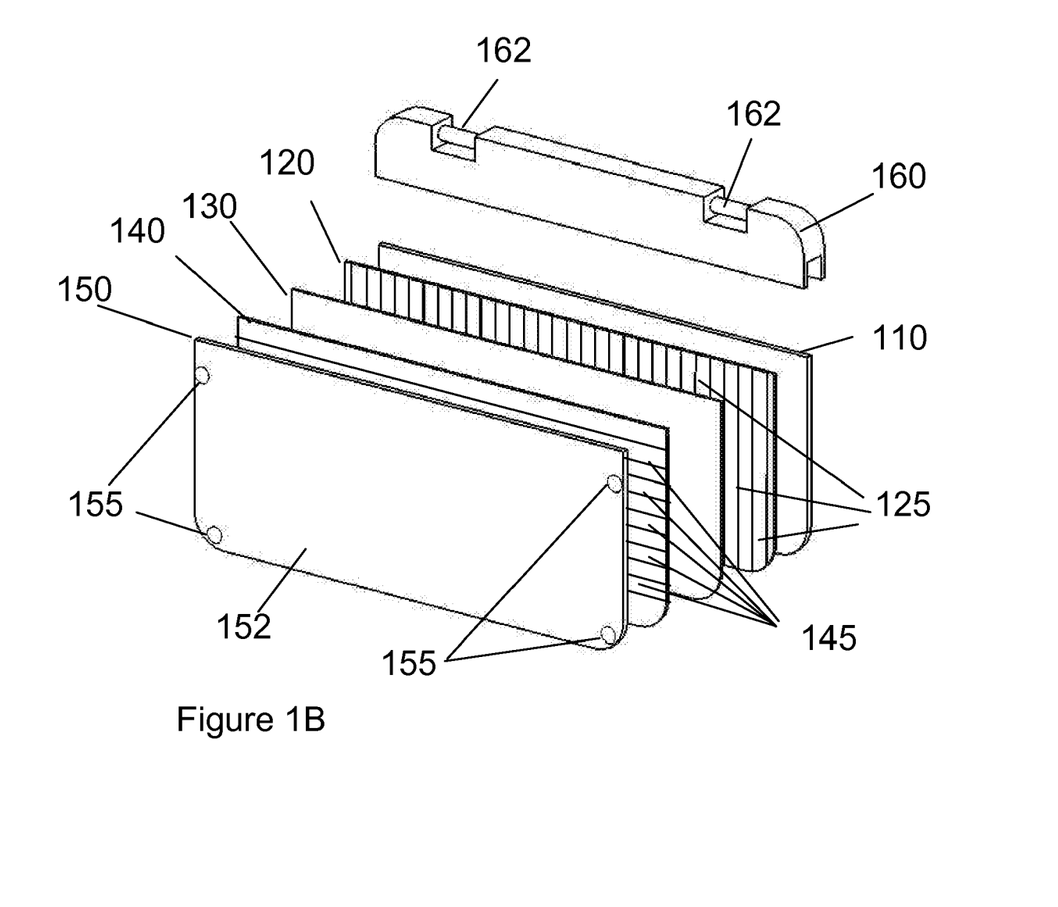
FIG. 1B is an exploded view of the sunlight attenuation apparatus.

FIG. 1B shows an exploded view of a sunlight attenuation apparatus 100. FIG. 1A is a perspective view of the apparatus 100. In one embodiment, the apparatus comprises: a first polarizer film 110; a glass substrate 120 with transparent indium tin oxide (ITO, or tin-doped indium oxide) electrodes 125 coated on; twisted nematic liquid crystals 130; another glass substrate 140 with common electrode film (ITO) 145 coated on; a second polarizer film 150; and a frame 160 to hold the components mentioned above. The first polarizer 110 is oriented vertically and polarizes light transmitted through the first polarizer 110. Approximately 50% of the light is absorbed by the polarizer 110 and approximately 50% of the light passes through and is polarized vertically. The liquid crystal molecules 130 are twisted in between two glass plates 120, 140. When no voltage is applied to the electrodes 125 and 145, the vertically polarized light transmitted and filtered from the first polarizer 110 is rotated by the liquid crystal helix of the nematic liquid crystals as it travels through the liquid crystal layer 130. When the light exits the liquid crystal layer 130, the polarization of the light is rotated by 90 degrees at zero voltage. Thus, the light can pass through the second polarizer film 150 which is oriented horizontally. In all, approximately 50% of the total light is transmitted through the apparatus 100 under no electric field.

When a voltage is applied to electrodes 125 and 145 between the twisted nematic liquid crystal layer 130, the electric field forces molecules to rotate to align its long molecular axes in the field direction, i.e. perpendicular to the electrodes 125 and 145. This rearrangement of molecules 130 distorts the helical structure formed by the molecules under no electric field.

Since the liquid crystal molecules 130 are constrained at the glass substrate surfaces 120 and 140, this rotation process is resisted by the elastic force. Only when the voltage between the electrodes 125 and 145 is above a certain level or a threshold such that the electrical field force is greater than the resistant force, the liquid crystal molecules then start to rotate. As the voltage continues to increase, the amount of molecules rotated and the degree of rotation increases, too. When the voltage applied is several volts above the threshold, all liquid crystal molecules 130 are aligned in the electric field direction so the twist form is completely unwound. This means that the degree of the distortion of the helical structure varies as a function of the voltage applied to the liquid crystal layer 130 through electrodes 125 and 145.

As mentioned above, the light polarization change that occurs in the light after passing the first polarizer 100 will depend on the twisted helical structure of the liquid crystal molecules. When the helical structure is distorted due to the applied electric field, the amount of the polarized light being rotated and subsequently the amount of the light transmitted through the second polarizer film 150 is reduced, i.e., the luminous transmittance of the device is decreased. When the helical structure is distorted under a high electric field, the polarization state of the light passing through the first polarizer film 110 is unaffected as it travels through the liquid crystal layer 130. Therefore, the light will be absorbed by the second polarizer 150 and no light will pass through. In other words, all light is blocked and the device has a transmittance of 0%. In short, the amount of light allowed to pass through the apparatus 100 is tunable between 0% and about 50% by controlling the voltage to the electrodes 125 and 145 across the nematic liquid crystal layer 130.

The minimum transmission of the apparatus 100 is set at some value above 0% according to some current standards or future established standards for automobiles. In one embodiment of the apparatus, this may be accomplished by configuring a power supply with a maximum output that yields the set minimum transmittance. The device may then be safely operated between the luminous transmittance of 50% and the set minimum by adjusting the voltage from zero to its maximum.

One or more photo-detectors 155 positioned behind an outer side 152 of the second polarizer 150 measure the light (the amount of light driver sees) transmitted through the apparatus 100. The output or the average output of all photo-detectors 155 provides a feedback to a voltage controller (not shown). The voltage controller then automatically adjusts the voltage level to electrodes 125 and 145 to achieve the preset light transmission. Despite the sunlight strength and brightness variation (affected by the time of the day, weather conditions, the time of the year, and the road direction and road curvature), the apparatus automatically filter out the proper amount of the sunlight and allow a relatively constant amount of light to pass through the apparatus. By automatically adjusting the voltage to the electrodes 125 and 145 across the liquid crystal layer 130, the amount of sunlight attenuated is automatically adjusted to sunlight changes to maintain constant transmittance. Thus, one advantage of the apparatus is that a driver may sense relatively constant and comfortable light levels. The driver will not be as bothered by the strong sunlight glare and the driver's view is thus greatly enhanced in this circumstance.

In another embodiment, the apparatus 100 can be operated with two parallel polarizers, in which the 50% and 0% transmission states are reversed (i.e., 50% transmittance under high electric field and 0% transmittance under no electric field). However, it is preferable (and safer) for the device to operate between two cross polarizers instead of between two parallel polarizers. This is due to the fact that for the former, the driver can still see clearly (in 50% of the light, compared to 0% of light from parallel polarizers) in case voltage supply does not function properly or power is cut. In addition, the transmitted light is more sensitive to small variation in thickness of the liquid crystal layer when the device is operating between two parallel polarizers, which may place increased burdens on manufacturing the apparatus 100.

The above mentioned glass plates 120 and 140 can include glass types capable of filtering out ultraviolet and near infrared light, since ultraviolet light is harmful to the retina and skin, and near infrared light just generates heat and does not contribute to a driver's viewing.

Figure 2A:
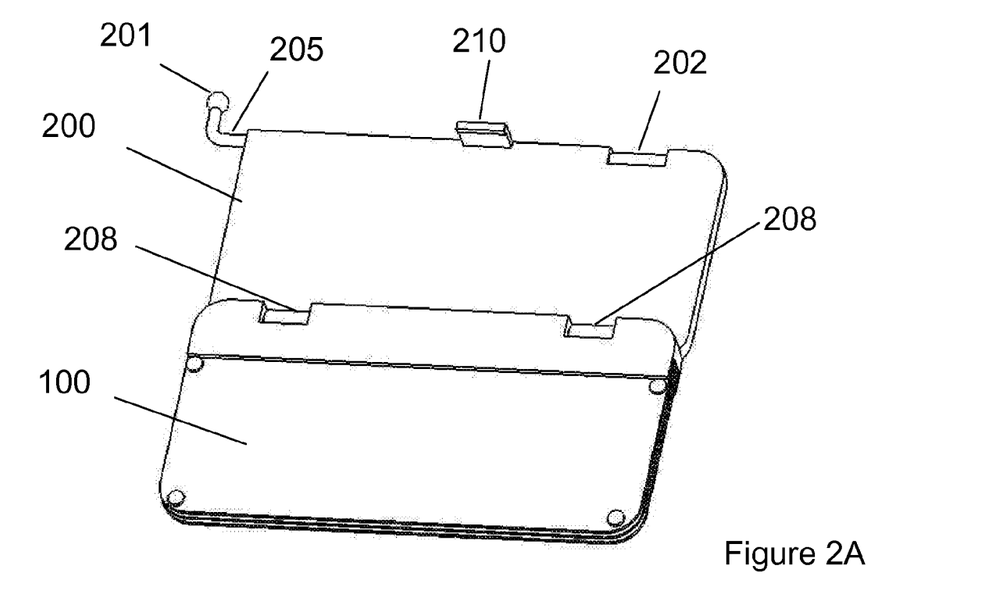
FIG. 2A is a perspective view of an embodiment of the sunlight attenuation apparatus with a traditional visor in an unfolded position.
Figure 2B:
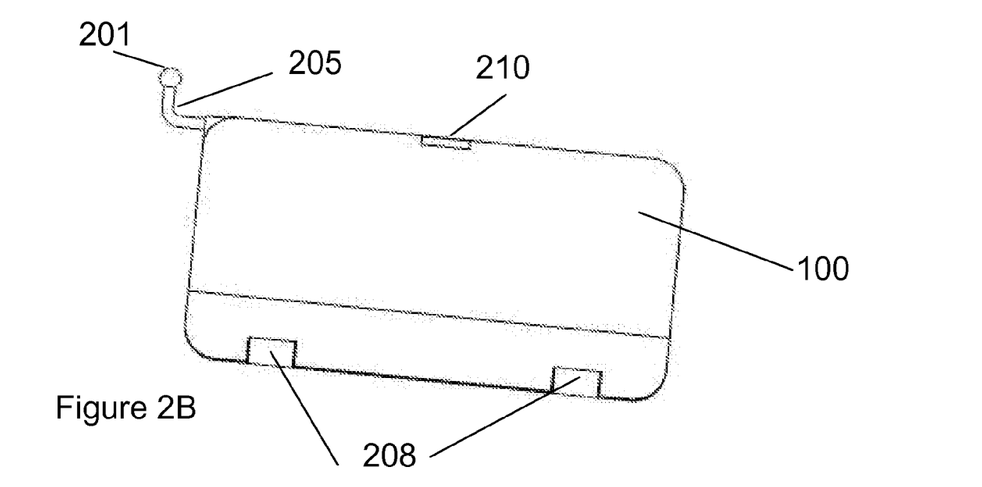
FIG. 2B a perspective view of an embodiment of the sunlight attenuation apparatus with a traditional visor in a folded position.
Figure 3:
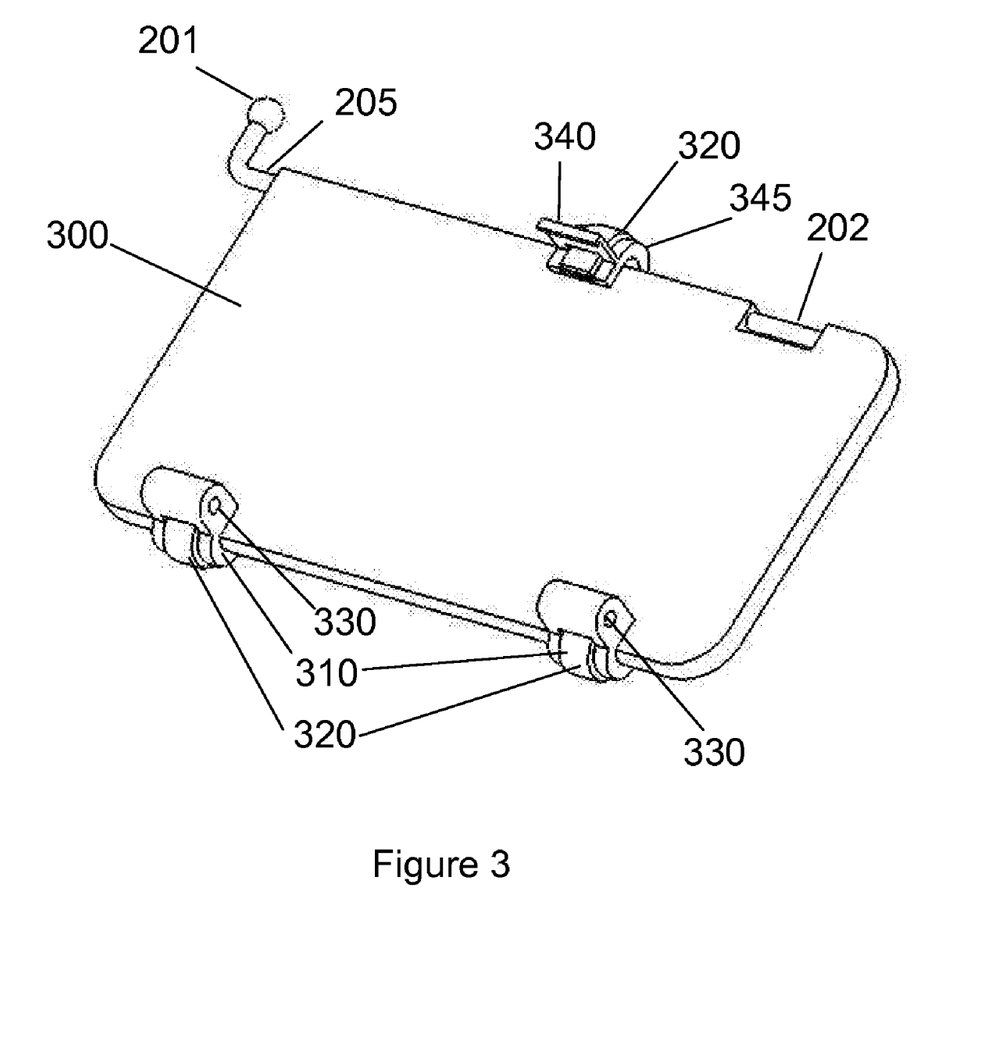
FIG. 3 is a rear perspective view of an embodiment of the sunlight attenuation apparatus with a traditional visor in a folded position.
Figure 4:
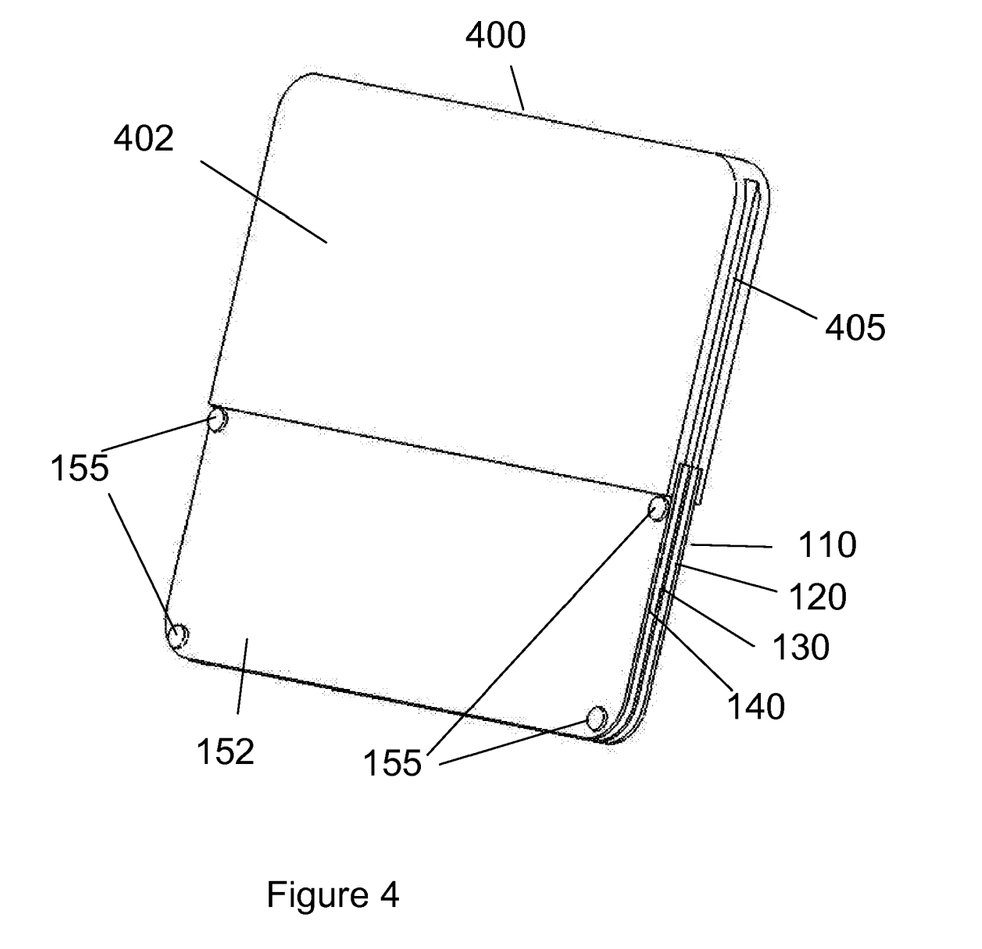
FIG. 4 is a perspective view of an embodiment of the sunlight attenuation apparatus suitable for use with a powered retracting unit.

FIGS. 2-4 show detailed views of an automatically adjusting sunlight attenuation apparatus 100 installed in a vehicle either in combination with a traditional opaque visor or independent of the opaque visor.

In one preferred embodiment, referring to FIG. 2A, the apparatus is configured as a visor 100 and may have the same dimensions as an opaque member 200 of the visor 100. The opaque member 200 may be assembled as an integrated unit with the apparatus 100. A ball end 201 of a fixed shaft 205 made of steel or any rigid material is mounted at a socket joint (not shown) on the vehicle frame. The ball and socket joint structure allows the visor to be swung into different positions. The exposed portions 202 of the shaft 205 are provided for inserting the visor into a spring-loaded socket (not shown) on the vehicle frame, which together with the ball 201 and socket joint structure permits the visor to be moved to and fixed at a desired angle and position.

In a preferred embodiment, the apparatus 100 is configured as a visor 100 and is secured to a frame 160. On the pivoting edge of the frame there is a shaft 162. Two protruding parts 208 of the free edge of an opaque member 200 of the visor 100 contain two spring loaded sockets or any friction creation devices for adapting the shaft 162. The device 100 can be entirely folded onto the opaque member 200 as shown in FIG. 2B so the whole unit functions just like a traditional visor. The spring clip 210 secures the device 100 in its folded position. When needed, the device 100 can be swung open and adjusted to any desired angle and position as shown in FIG. 2A. The device 100 then performs the above described function of automatically adjusting to sunlight changes. The friction between the sockets 208 and shaft 162 can maintain and secure the visor 100 firmly to a set angle and position.

In another embodiment, illustrated in FIG. 3, the adjustable sunlight attenuation apparatus 100 can be installed in a vehicle in which a traditional opaque visor 200 is already installed. Jaws 310 and spring clips 320 are installed to the free edge of the visor. Shaft 162 on the frame 160 which holds the device 100 is then installed into spring-loaded sockets 330 or any other friction generating means. A spring clip 340 is secured in the middle of the pivoting edge of the visor by the jaw 345 and spring clip 320. When the device 100 is in folded position, the spring clip 340 will hold the device 100 in place. The auto-adjustable sunlight attenuation device can thus perform its function as shown above in FIG. 2.

In a further embodiment, the automatically adjusting sunlight attenuation apparatus 100 is installed independent of a traditional opaque visor as a powered retracting unit, similar to a powered retracting window. As shown in FIG. 4, the apparatus 100 is secured into a second frame 400. In one example, the second frame 400 is wider than frame 160. The second frame 400 may have an opaque portion 402 and may act like a traditional visor to block sunlight from an upper region of a windshield. The frame 400 may be installed onto two motorized rails (not shown) through grooves 405 in sides of the frame 400 and the motorized rails may be connected to a forward portion of a roof of a vehicle near the windshield. When needed, the device is powered to extend downward to a front view of the driver against the windshield after the driver operates a switch. The device may then be retracted on the roof after the switch is pushed the second time.

Figure 5:
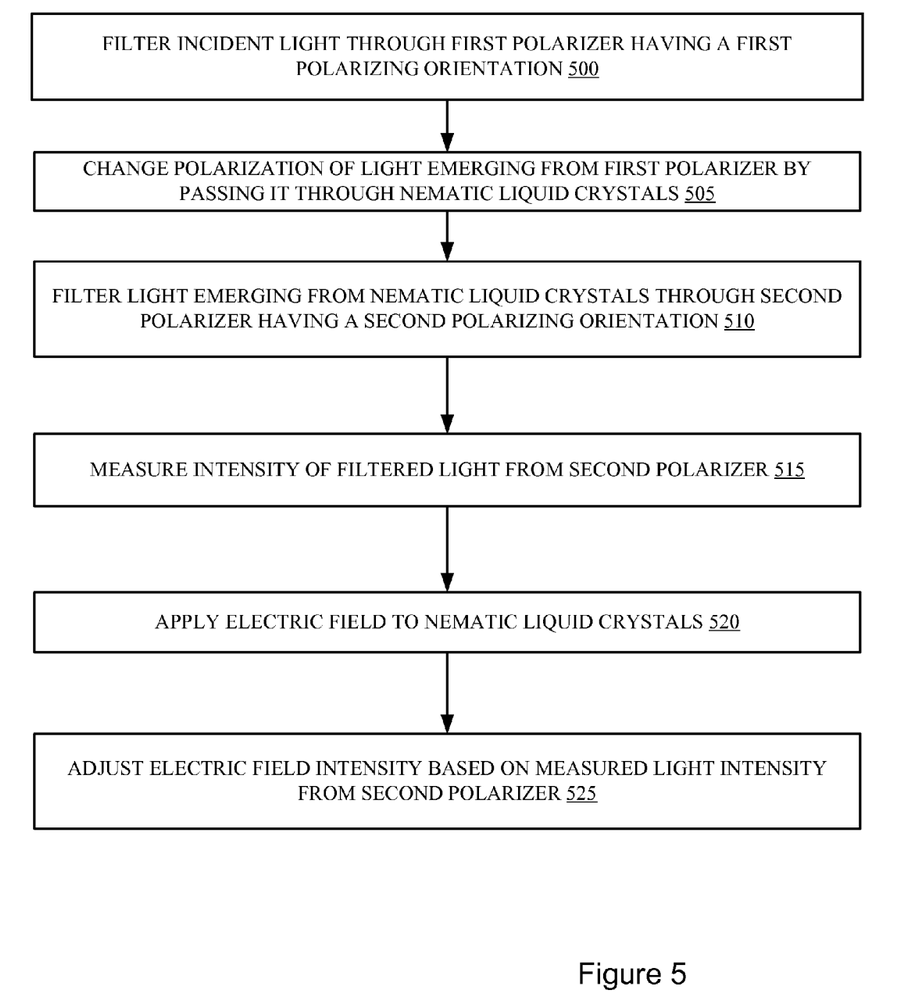
FIG. 5 is a flow chart illustrating a method sunlight attenuation in accordance with the principles of invention.

FIG. 5 is a flow chart illustrating a method of attenuating sunlight in an automobile. In a step 500, incident sunlight is filtered through a first polarizer having a first polarizing orientation. In a step 505, the polarization of sunlight filtered from first polarizer is changed by passing it through nematic liquid crystals. In a step 510, the sunlight whose polarization is rotated by the nematic liquid crystals is filtered through a second polarizer having a second polarizing orientation. In a step 515 the intensity of filtered light from the second polarizer is measured and in a step 520 an electric field is applied to the nematic liquid crystals. In a step 525, an electric field is applied to the nematic liquid crystals having an strength that is varied based on the intensity of the filtered light from the second polarizer.

Figure 6:
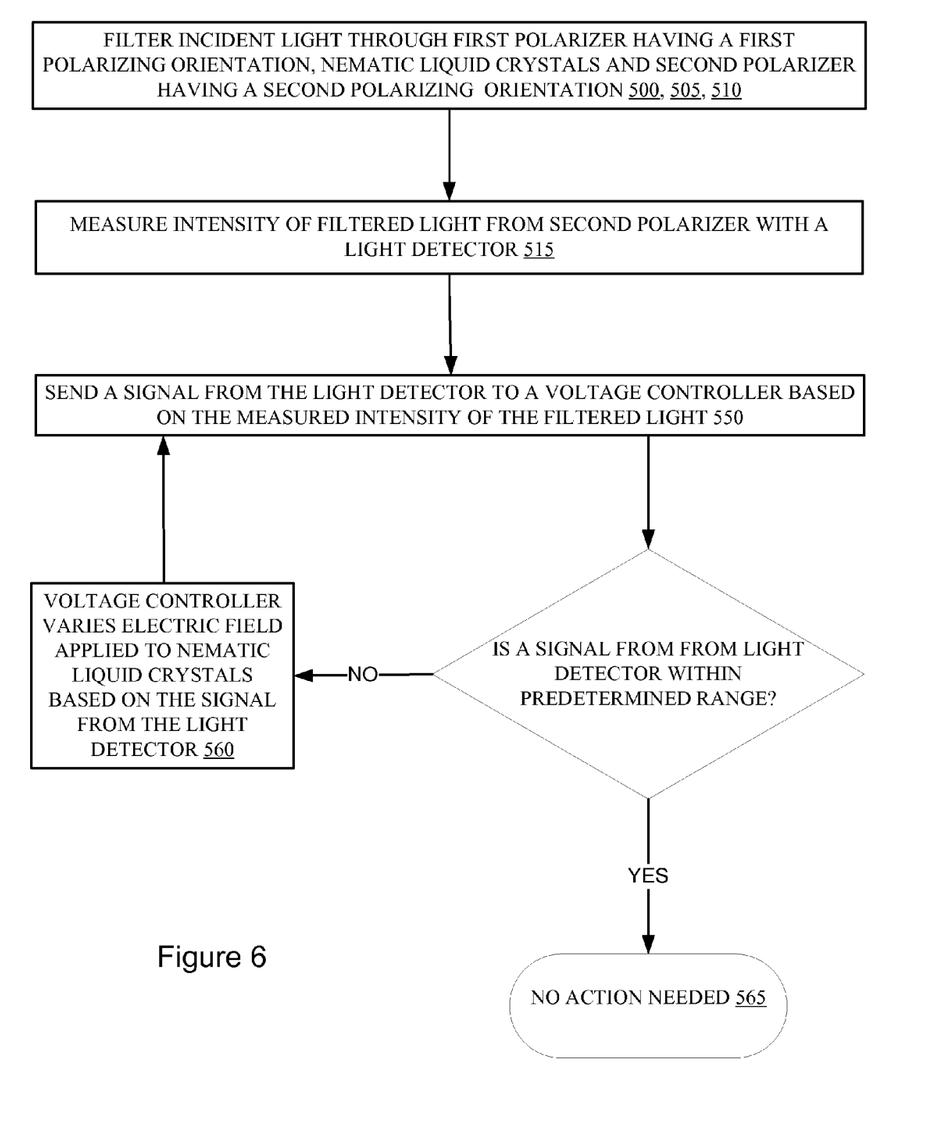
FIG. 6 is a flow chart illustrating a further method sunlight attenuation in accordance with the principles of invention.

In another embodiment, a method of attenuating sunlight in an automobile is illustrated in FIG. 6. In steps 500, 505, and 510, incident sunlight is filtered through a first polarizer having a first polarizing orientation, nematic liquid crystals and a second polarizer having a second polarizing orientation. In a step 515, the intensity of the filtered light is measured by a light detector. In a step 550, the light detector sends a signal to a voltage controller based on the measured intensity of the filtered light. If the signal from the light detector is within a predetermined range, in a step 565 the voltage controller will not change voltage applied to the electrodes and hence, will not change the electric field applied to the nematic liquid crystals. If the signal from the light detector is outside the predetermined range, in a step 560 the voltage controller will vary the electric field to the nematic liquid crystals accordingly, by varying the voltage to the electrodes, until the signal from the light detector is within a predetermined range.

The present invention provides a novel solution to problems many drivers face every day. That is, to automatically reduce strong sunlight to and maintain at a comfortable level for drivers, which not only allows them to avoid the strong glare from sunlight to enhance their view, but also speeds up traffic to save time. Environmental benefits of the present invention include helping to reduce gas consumption and greenhouse gas generation.

The above description of the present invention is only the preferred embodiments of the inventions. Embodiments may include any currently or hereafter-known versions of the elements described herein. Different methods and elements may be used to secure the device and installed to a vehicle. Different materials which have a similar optical properties as liquid crystal molecules may be used to automatically attenuate sunlight.

While there has been shown and described what is considered to be preferred embodiments of the invention, it will, of course, be understood that various modifications and changes in form or detail could readily be made without departing from the spirit of the invention. It is therefore intended that the invention not be limited to the exact forms described and illustrated, but should be constructed to cover all modifications that may fall within the scope of the appended claims.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional or physical configurations can be implemented to achieve the desired features of the present invention. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An apparatus for adjusting the intensity of light transmitted through the apparatus, comprising:
   a first polarizer having a polarizing orientation;
   a second polarizer having a polarizing orientation perpendicular to the polarizing orientation of the first polarizer;
   a first and second electrodes disposed between the polarizers
   a nematic liquid crystal layer disposed between the electrodes;
   at least one light detector positioned for measuring the intensity of the transmitted light; and
   a voltage controller in electrical communication with the light detector for controlling the voltage level applied to the electrodes based on the intensity of the measured light wherein the voltage determines the amount of light transmitted through the apparatus and the voltage controller is configured to vary the voltage to the electrodes until the output from the plurality of light detectors falls within a predetermined range.

2. The apparatus of claim 1,
   wherein the voltage controller is configured to compel the electrodes to apply substantially the same electric field for all signals from the light detectors that fall outside a predetermined range.

3. The apparatus of claim 1, further comprising:
   a plurality of light detectors in electrical communication with the voltage controller and configured to send a signal to the voltage controller based on the intensity of the measured light.

4. A visor for adjusting the intensity of light transmitted through the visor, comprising:
   a first polarizer having a polarizing orientation;
   a second polarizer having a polarizing orientation perpendicular to the polarizing orientation of the first polarizer;
   a first and second electrodes disposed between the polarizers;
   nematic liquid crystals disposed between the electrodes;
   a voltage controller for controlling the voltage level applied to the electrodes wherein the voltage determines the degree of distortion of the nematic liquid crystals, and thus the amount of light transmitted through the apparatus;
   an opaque member;
   a light filtering portion comprising a frame having a pivoting edge and connected to and for supporting the first and second polarizers and the nematic liquid crystals;
   a shaft connected on a pivoting edge of the frame;
   two connecting portions on the pivoting edge of the frame for connecting the shaft to the opaque member;
   wherein the light filtering portion can be folded onto the opaque member so that the visor can function as a traditional visor or unfolded to automatically adjust the amount of light filtered through the apparatus.

5. The visor of claim 4, further comprising:
   a jaw and spring clip assembly for connecting the visor to a traditional visor on a lower edge of the traditional visor;
   friction generating means for permitting selective positioning of the visor when the visor is rotated out of a folded position; and
   a spring clip for removably securing the visor to an upper edge of the traditional visor;
   wherein when the visor is in a folded position, the spring clip will removably hold the visor to the traditional visor in the folded position.

6. The visor of claim 5 wherein the friction generating means is a spring-loaded socket.

7. The visor of claim 4, further comprising a frame having an opaque portion, the frame connected to and supporting the first and second polarizers and the nematic liquid crystals, and the frame having grooves slidable on a motorized rail connectable to a vehicle.

8. The visor of claim 4, further comprising at least one light detector positioned on an outer side of the second polarizer for measuring the intensity of the transmitted light and wherein the voltage controller is in electrical communication with the light detector for controlling the voltage level applied to the electrodes based on the intensity of the measured light wherein the voltage determines the amount of light transmitted through the apparatus.

9. The visor of claim 4, further comprising at least one light detector for measuring the intensity of the transmitted light, the light detector positioned on an outer side of the second polarizer so that the second polarizer is positioned between the light detector and the first polarizer; and
   wherein the voltage controller is in electrical communication with the light detector for controlling the voltage level applied to the electrodes based on the intensity of the measured light wherein the voltage determines the amount of light transmitted through the apparatus.

10. An apparatus for adjusting the intensity of light transmitted through the apparatus, comprising:
    a first polarizer having a polarizing orientation;
    a second polarizer having a polarizing orientation perpendicular to the polarizing orientation of the first polarizer;
    a first and second electrodes disposed between the polarizers a nematic liquid crystal layer disposed between the electrodes;
    at least one light detector positioned for measuring the intensity of the transmitted light; and
    a voltage controller in electrical communication with the light detector for controlling the voltage level applied to the electrodes based on the intensity of the measured light wherein the voltage determines the amount of light transmitted through the apparatus;

wherein the voltage controller is configured to compel the electrodes to apply substantially the same electric field for all signals from the light detector that fall outside a predetermined range.

11. The apparatus of claim 10, further comprising a plurality of light detectors in electrical communication with the voltage controller and configured to send a signal to the voltage controller based on the intensity of the measured light wherein the voltage controller is configured to compel the electrodes to apply substantially the same electric field for all signals from the light detectors that fall outside a predetermined range.

* * * * *